United States Patent [19]

Severijns et al.

[11] Patent Number: 4,986,620
[45] Date of Patent: Jan. 22, 1991

[54] PASSIVE FIBER-OPTIC COMPONENT

[75] Inventors: Adrianus P. Severijns; Petrus J. W. Severin; Cornelus H. M. Van Bommel, all of Eindhoven, Netherlands

[73] Assignee: U.S. Philips Corp., New York, N.Y.

[21] Appl. No.: 49,621

[22] Filed: May 13, 1987

Related U.S. Application Data

[62] Division of Ser. No. 853,309, Apr. 17, 1986, Pat. No. 4,698,084.

[30] Foreign Application Priority Data

Apr. 19, 1985 [NL] Netherlands ............... 8501147

[51] Int. Cl.⁵ .............................................. G02B 6/26
[52] U.S. Cl. .................... 350/96.15; 350/96.16; 350/96.21; 350/96.24; 350/96.33
[58] Field of Search ............... 350/96.15, 96.16, 96.20, 350/96.21, 96.22, 96.24, 96.33

[56] References Cited

U.S. PATENT DOCUMENTS

| | | | |
|---|---|---|---|
| 3,148,967 | 9/1964 | Hicks | 65/4 |
| 3,244,851 | 4/1966 | Thomas | 219/59 |
| 3,301,648 | 1/1967 | Sheldon | 64/1.5 |
| 3,333,278 | 7/1967 | Hawkins et al. | 156/155 |
| 3,395,006 | 7/1968 | Hopkins et al. | 65/12 |
| 3,502,455 | 3/1970 | Gardner | 65/31 |
| 3,563,716 | 2/1971 | Li | 65/4.21 |
| 3,690,853 | 9/1972 | Law | 65/4.2 |
| 4,179,185 | 12/1979 | Hawk | 350/96.16 |
| 4,291,940 | 9/1981 | Kawasaki et al. | 350/96.15 |
| 4,360,248 | 11/1982 | Bickel et al. | 350/96.16 |
| 4,400,055 | 8/1983 | Ozeki et al. | 350/96.15 |
| 4,551,162 | 11/1985 | Hicks | 65/4.2 |
| 4,612,028 | 9/1986 | Abebe et al. | 65/4.2 |
| 4,632,513 | 12/1986 | Stowe et al. | 350/96.15 X |
| 4,666,234 | 5/1987 | Emkey | 350/96.15 |
| 4,708,426 | 11/1987 | Khoe | 350/96.18 |
| 4,720,161 | 1/1988 | Malavieille | 350/96.15 |

FOREIGN PATENT DOCUMENTS

| | | |
|---|---|---|
| 0081349 | 6/1983 | European Pat. Off. . |
| 0123396 | 10/1984 | European Pat. Off. . |
| 1492405 | 11/1977 | United Kingdom . |

Primary Examiner—Frank Gonzalez
Attorney, Agent, or Firm—Ernestine C. Bartlett

[57] ABSTRACT

A passive fiber optic component, in which two or more fibers are each bared at one end by removal of the outer coating of the fiber. The bare portions of the fibers are etched to produce cylindrical end portion which adjoins a conical portion. Subsequently, the fibers are arranged with their etched portions in a capillary tube which is sealed at one end. The tube is then evacuated and is fused with the etched portions of the fibers to form a solid rod with a rotationally symmetric distribution of the end portions of the fibers. The fibers are etched to such a diameter that after fusion of the fibers with the tube, the fused fiber ends have a circular cross-section substantially equal to the cross-section of a single fiber core. An end face is formed on the rod by cleaving or by grinding, and by polishing to obtain a fused fiber head. The fiber head forms a fiber optic component itself, or forms a basic element for a great number of fiber optic components such as splitters and couplers.

12 Claims, 4 Drawing Sheets

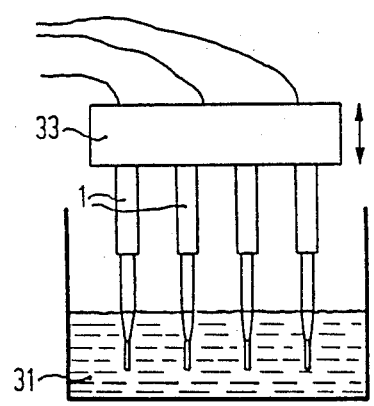
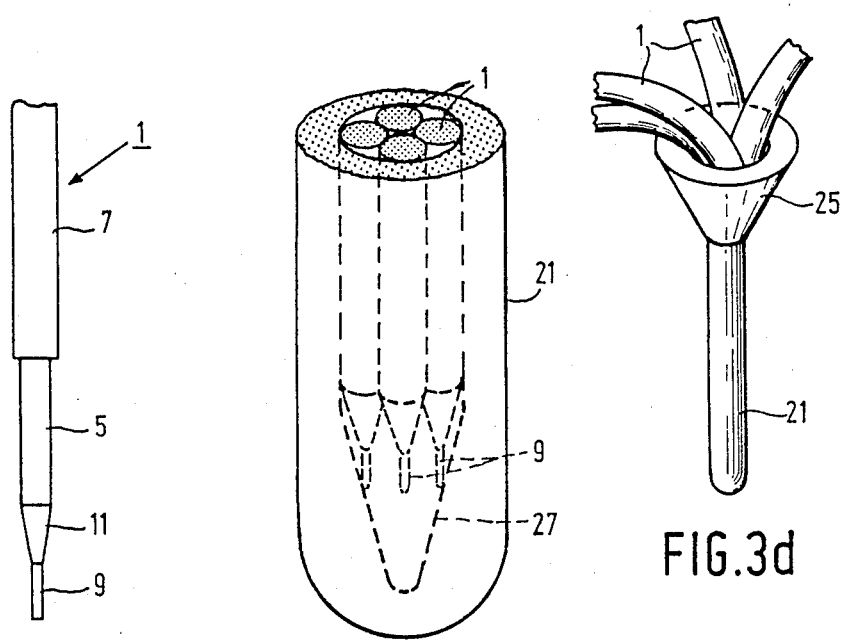
FIG. 3a
FIG. 3b FIG. 3c FIG. 3d

PASSIVE FIBER-OPTIC COMPONENT

This is a division of application Ser. No. 853,309 filed Apr. 17, 1986, now U.S. Pat. No. 4,698,084 issued Oct. 6, 1987.

BACKGROUND OF THE INVENTION

The invention relates to a method of manufacturing a passive fiber optic component. The component comprises at least two optical fibers, each having a core of core glass, a cladding of cladding glass with a refractive index lower than that of the core glass, and an outer coating.

In the method, a part of each fiber is bared by removal of the outer coating over a given length from one end of the fiber. The bare parts of the fibers are subjected to an etching treatment whereby a portion of the etched part of each fiber is given a conical shape. The etched portions of the fibers are then arranged against each other in a tube of a glass having a refractive index lower than that of the core glass of the fibers. By applying heat, the tube is fused to the fibers and the bare parts of the fibers are fused together. Finally, the fused fiber bundle is provided with a polished end face.

A method for manufacturing a fiber optic component is described, for example, in U.S. Pat. No. 4,291,940 and in European Patent Application 0,123,396. These publications describe the manufacture of couplers according to a hot processing method, the so-called fused biconical taper technique. In this method, two fibers are twisted and are then heated and stretched in such a manner that a coupler with a symmetrical biconical configuration is obtained. In the biconical taper method, the risk of damage of the fiber and of deformation of the fiber core is comparatively high. The method is only suitable for the manufacture of certain types of components, is not readily reproducible, and is not suitable for use in mass production. Furthermore the input fiber can be recognized on the output side, which means that there is no uniform distribution of the input power.

The first method discussed above is described in British Patent Application 1,427,539 (corresponding to U.S. Pat. No. 3,933,455). In this method the fibers are not twisted. The fibers are drawn down together with the glass tube in which they are inserted to provide a tapered zone from which interstices between the fibers have been eliminated. The presence of a taper in this zone means that the diameter of the end face has to be selected by arranging it at an appropriate distance along the length of the tapered zone. Considering the core diameter of the fibers to be treated (50 μm or smaller), it will be difficult to select the correct diameter of the end face within close tolerances. The taper angle is dependent on several parameters and may vary from fiber bundle to fiber bundle.

SUMMARY OF THE INVENTION

It is an object of the invention to provide a method of manufacturing passive fiber optical components, which method is flexible and by means of which different types of components can be manufactured on a large scale in an economical manner and with the required precision.

According to the invention, a fiber optic component is manufactured by etching the bare part of each fiber to produce a cylindrical end portion which adjoins the narrow end of the conical portion. The tube is a capillary tube which is sealed at one end. The tube and at least the cylindrical end portions of the fibers (inserted in the tube) are softened by heat while the tube is evacuated so that the wall of the tube collapses against the fibers. While maintaining its circular cross-section (under the influence of surface tension), the capillary tube deforms the end portions of the fibers to eliminate the interstices between them and to give these portions of the fibers collectively a circular cross-section. Together with the tube, the fibers form a solid rod of circular cross-section. The tube is fused by the heat to the end portions of the fibers.

Subsequently, the sealed end of the rod is removed to form on the rod an end face on which the ends of the end portions of the fibers are exposed. The diameter of the circular cross-section of the end portions after the deformation is substantially equal to the diameter of the core of a single fiber.

Finally, the end face is polished and finished to obtain a fused fiber head.

By means of the method according to the invention, different optical components (such as splitters, directional couplers, transmissive and reflective star couplers, multiple connectors and the like) can be manufactured with the required micron accuracy in mass production and in a comparatively inexpensive manner.

The fiber head itself may constitute a fiber optic component or it may be coupled with a single fiber or with another identical or similar fiber head to form a passive fiber optic component. Since the process parameters are known and controllable, and the product is accessible for inspection and verification, the process is also reproducible and suitable for automatization. As the end portion of each fiber is cylindrical and as the final rod is also cylindrical (at least over a certain length) and has a predetermined diameter, the end face need not have any particular diameter. The end face may be cut along the cylindrical part of the rod within large tolerances.

Due to the conical portion situated between the cylindrical end portion and the unetched fibers, a strong and abrupt bending of the fiber cores during the fusion step is prevented. The cross-section of the fused cylindrical fiber ends progressively increases toward the unetched fiber portions.

As the capillary tube with the fibers inserted therein is not drawn, the wall thickness of the capillary tube is not reduced. Therefore, at the end face the fused ends are surrounded by a relatively large annular area formed by the wall of the capillary tube. This forms a large bonding surface.

During heating, the evacuated capillary tube will flow and shrink under the influence of atmospheric pressure while maintaining its circular cross-section due to surface tension. The end portions of the fibers are deformed into a rotationally symmetrical pattern within the shrunk tube.

The controlled reproducibility obtained in this way is essential for mass, automated production. No external forces, which could damage the fibers, are exerted on the fibers.

In the method according to the invention, step index fibers, graded-index fibers, monomode fibers, or multimode fibers can be used.

Since the capillary tube serves as a cladding in the finished product, the tube should be made of a glass having a refractive index lower than that of the core glass of the fibers. Preferably, the refractive index of the tube is equal to that of the cladding glass.

The glass of the capillary tube preferably has a softening temperature slightly higher than that of the core glass. Given a suitable softening temperature and a suitable refractive index of the core glass of the fibers to be fused together, preferably the capillary tube is quartz glass.

The outer coating of the fibers generally consists of a synthetic material, such as for example a UV curing acrylate.

As the fused fiber ends have a circular cross-section substantially equal to the cross-section of a single fiber core, a splitter is simply assembled by gluing the single fiber to be coupled in a capillary tube having a diameter substantially equal to the diameter of the fiber head. In a known arrangement, the fiber head and the individual fiber are aligned with respect to each other so as to obtain the best compromise between a maximum total signal transmission and a uniform distribution of power over the output ports. Subsequently, at the coupling area, glue (for example UV curing glue of the correct refractive index) is added. After the distribution over the fibers has been verified and, as the case may be, has been corrected, the UV curing glue is cured. Ultimately, the assembly is encapsulated in a suitable quartz tube, for instance by epoxy.

For assembling a coupler it is sufficient to couple the end faces of two fused fiber heads obtained by the method according to the invention (and having the required number of fibers) to each other, as the diameters of the fiber heads and of the fused fiber ends are the same. If the claddings in the cylindrical end portions of the fibers are completely etched away, a loss-free coupler is formed with rotational symmetry and with complete mixing, when using step-index fibers. When using graded-index fibers, a low-loss coupler is obtained with rotational symmetry and with only a limited amount of coupling, but the input fiber can be recognized.

If the claddings of the fibers are not entirely etched away, no or substantially no mixing occurs in the fiber head. If no mixing occurs at all, the degree of coupling can be completely controlled by relative rotation of the two fiber heads. With step index fibers, a symmetrical directional coupler is thus obtained with an arbitrary fixed or variable coupling ratio and with low losses due to a remaining central line of cladding glass.

If the claddings of the fibers are entirely etched away, there is a base level of coupling which depends upon the length of the fiber head. A variable amount of coupling can be added by relative rotation of the two fiber heads. For graded-index fibers, the power is rather confined to the core. Even if the claddings of the fibers are entirely removed, there is the possibility of incomplete mixing. However, by rotationally symmetric positioning, a loss-free directional coupler with a low coupling ratio can be obtained. By rotation, the losses increase with the coupling ratio due to the fact that the center lines of the fibers do not coincide.

The same coupling ratio can be reached only by a larger angle of rotation if the claddings are not entirely removed. The losses increase due to the fact that the center lines do not coincide. With a coupling ratio of 1:1, the loss is equal to the square of the loss of the two-way splitter.

Couplers consisting of two, three or four input and output ports and manufactured by the method according to the invention form a new class of products. Since such couplers with step-index fibers are loss-free and can be used more widely than those with graded-index fibers, the advantages obtained by the use of step-index fibers instead of graded-index fibers in networks, especially local area networks in which many passive fiber-optic components are required, are evident. Joining an M-fiber head to an N-fiber head gives rise to components with special properties, which may be useful in fiber optic networks.

Star couplers form an extension of the aforementioned series of components and may be composed of graded-index fibers or of step-index fibers. Since in a star coupler With step-index fibers a complete mixing takes place, the input power is distributed equally over all the fiber cores so that the individual fibers cannot be distinguished. In one such star coupler, for instance, two multiple fused fiber heads are coupled to each other directly by their end faces.

In a star coupler composed of graded-index fibers, the input power is not distributed equally over all the fibers. Therefore, the two fiber heads have to be coupled to each other by means of a mixing element like a mixing rod or graded-index rod.

A fiber head obtained by means of the method according to the invention provides an ideal possibility for transmitting laser power. By using a bundle of step-index fibers having at cladding entirely etched away from the free ends which are finished to form individual fiber heads, the power of a single laser can be used for welding or soldering several spots at a time. In the fiber head, the input laser power is mixed by coupling in such a manner that all fibers transmit the same power at the output end. Furthermore the shape of the output head can be adapted to the shape of the workpiece.

In the above embodiments of the method according to the invention, it is assumed that the fibers to be fused together fit into the capillary tube with their bare non-etched cladding with a narrow tolerance and in a regular pattern. This assumption is limited to a maximum number of five fibers.

When six or more fibers or a larger number of fibers are to be processed, it is not possible to pack the fibers tightly in the capillary tube since space larger than a fiber remains at the center of the tube. In order nevertheless to be able to carry out the process, in a preferred embodiment of the method according to the invention the fibers are regularly distributed around the inner circumference of the capillary tube and are supported there by a cylindrical supporting member. The supporting member is arranged centrally in the capillary tube.

The fibers are adhered, via their bare claddings, to the inner surface of the capillary tube by a thermal pretreatment. Then the supporting member is removed, and the tube and the etched end portions of the fibers are fused. During fusion of the capillary tube with the end portions of the fibers, the central space becomes filled by the fibers, which are each deformed into a sectorial cross-section. The deformed fibers are uniformly arranged in a symmetrical pattern around the inner circumference of the capillary tube.

It is an essential characteristic of the method according to the present invention that the products have a circularly symmetric distribution of fibers. This implies that each segment radiates into the opposite end with the same property so that there is no difference in the mode effects whatever input fiber is excited and whatever output fiber is measured. Not only the energy is distributed equally over the fibers, but also the mode spectrum is the same for all fibers. This has advantages for following fiber optic components downstream in a network.

A fiber head manufactured by the method according to the invention can even act as a fiber optic component, or as input and/or output end of a bundle of fibers. In the embodiments already described, the fiber head constitutes a standard fiber optic component which serves as a basic element for a complete series of different composite fiber optic components.

BRIEF DESCRIPTION OF THE PREFERRED EMBODIMENTS

FIGS. 3a to 3i show successive steps in the manufacture of a splitter by means of the method according to the invention.

DESCRIPTION OF THE PREFERRED EMBODIMENTS

Figure 1A:
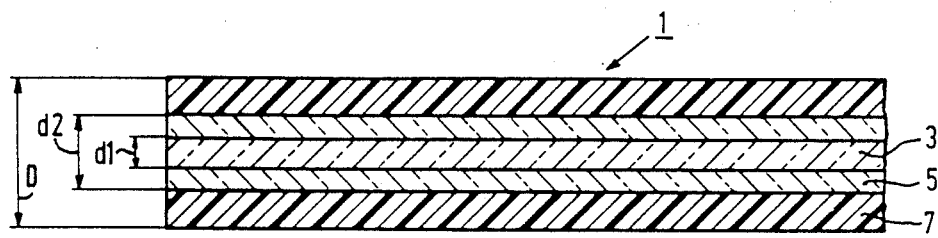
FIG. 1a is an axial sectional view of an optical fiber, drawn to a greatly enlarged scale.

For manufacturing a fiber optic component by means of the method according to the invention, first a number of optical fibers as shown in FIG. 1a are cut to a desired length. In practice, the fibers may be cut to approximately 1 meter.

The optical fiber 1 shown in FIG. 1a comprises a glass core 3 having a diameter d1, a glass cladding 5 having a diameter d2, and an outer protective coating 7 having a diameter D. The cladding 5 is made of a glass having a refractive index lower than that of the core glass. The coating 7 generally consists of a synthetic material, such as a UV curing acrylate. A commonly used optical fiber has a diameter D of 250 $\mu$m, while the cladding 5 has a diameter d2 of 125 $\mu$m, and the core 3 has a diameter d1 of 50 $\mu$m.

Figure 1B:
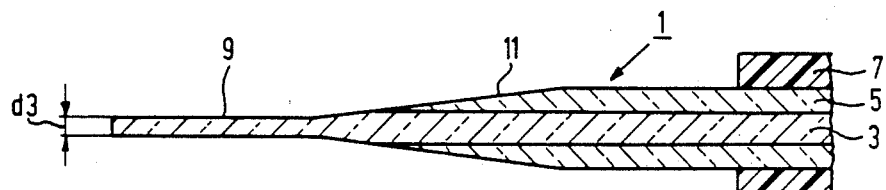
FIG. 1b is a similar view of the optical fiber after the etching treatment according to the invention.

For preparing the fibers, first the coating 7 is removed over a length of a few centimeters from one end of each fiber by immersing this portion of the fiber in dichloromethane or by burning with a flame. Subsequently, the portions of the fibers thus bared are etched in such a manner that over a length of approximately 1 centimeter a cylindrical etched end portion 9 is obtained adjoining a conical etched intermediate portion 11. (FIG. 1b.) Conical portion 11 in turn adjoins the non-etched bare cladding 5 having its original diameter d2.

Depending upon the desired properties of the fiber optic component to be manufactured, the cladding 5 may be only partly removed at the cylindrical etched end portion 9 or may be entirely removed at this portion (that is to say, removed to the interface between cladding and core, in which case the core 3 retains its original diameter d1). For some applications, for example for the manufacture of a splitter having at most four fibers, or with the use of graded index fibers, the etching treatment is continued until a part of the core is also etched away so that the cylindrical etched end portion 9 has a diameter d3 which is smaller than the original diameter d1 of the core 3. This situation is shown in FIG. 1b.

The fibers are etched by immersing the fibers in a HF solution with a concentration of, for instance, 50%. The conical etched portions 11 are obtained by moving the fibers up and down during etching; the stroke of this movement determines the length of the conical portion 11, which is on the order of millimeters to centimeters. The diameter d3 of the cylindrical etched end portion 9 is determined so that when the end portions of the fibers are subsequently fused together in the required number they will together have a cross-section substantially identical in shape and size to that of a single fiber core 3.

Figure 2A:
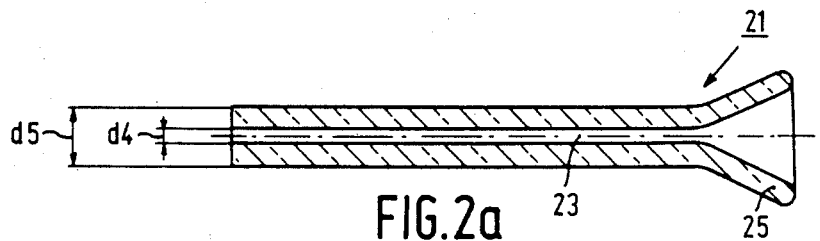
FIGS. 2a, 2b and 2c are axial sectional views, drawn to an enlarged scale, of a capillary tube used in the invention, in successive processing stages.
Figure 2B:
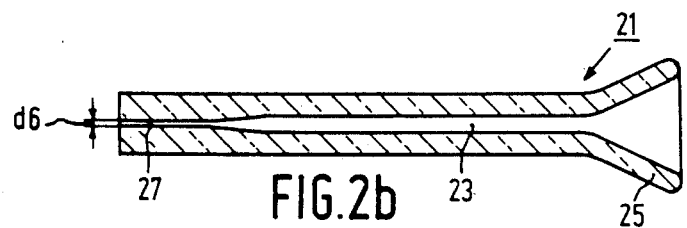
Figure 2C:
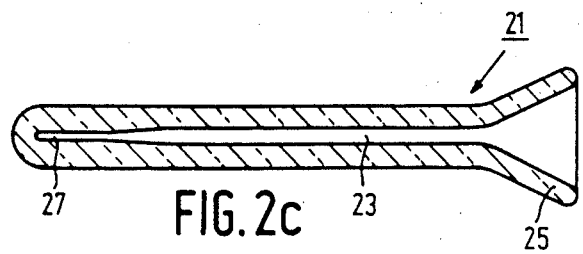

FIGS. 2a, 2b and 2c show successive steps in the processing of a capillary tube 21 required for carrying out the present example of the method according to the invention. The capillary tube 21 is obtained by drawing a long tube from a preform of quartz glass, then subdividing this tube into capillary tubes 21 each having a length of about 3 to 6 centimeters, approximately equal to the length of the bare portions of the fibers. The glass of the tube 21 has a refractive index lower than that of the core glass of the fibers.

The diameter d4 of the capillary duct 23 in each tube 21 is chosen so that the bare portions of the required number of fibers will fit into it with a small amount of clearance of about 10 $\mu$m. In view of the required accuracy of shape and in order to obtain a sufficient mechanical strength of the tube 21 and of the ultimate product, a comparatively large wall thickness of 1 to 2 millimeters is chosen. For the usual products, the duct 23 has a diameter d4 of 260 to 400 $\mu$m, while the tube 21 has a diameter d5 of 2.5 to 6 millimeters.

The tube 21 shown in FIG. 2a is formed with a funnel 25 at one end. The funnel 25 facilitates the insertion of the fiber ends into the capillary tube and offers a bonding surface for adhering the outer coating of the fibers to the capillary tube.

For receiving fibers whose cores are etched down to a smaller diameter than the original diameter, and in order to obtain an optimum positioning of the fiber ends the capillary duct 23 is provided at the end remote from the funnel 25 with a restriction 27, as shown in FIG. 2b. The restriction can be obtained by heating and shrinking under the influence of surface tension or by drawing down. The restriction 27 is given a diameter d6 such that the cylindrical etched end portions 9 of the fibers will fit into it.

Subsequently, the tube 21 is sealed at the end with the restriction 27. FIG. 2c shows the finished capillary tube 21. However, the process of restricting and sealing the capillary tube 21 may also take place at a later stage.

Hereafter, an embodiment of the method according to the invention for manufacturing a splitter having four output ports will be described. FIGS. 3a and 3i schematically show the successive steps.

FIG. 3a shows the etching of four fibers 1 in an etching bath 31. For this purpose, the fibers 1 are fixed in a holder 33, which can be moved up and down.

FIG. 3b shows a fiber 1 after the etching treatment. Fiber 1 has a cylindrical etched end portion 9 as already described. Fiber 1 also has a conical etched portion 11, a bare non-etched clad portion 5, and a fully coated portion 7.

The bare portions of the four fibers prepared in this manner are then inserted into the capillary tube 21, into which the fibers fit with a narrow tolerance. This is shown in FIG. 3c, which shows only a part of the capillary tube which is sealed already. As shown in FIG. 3d the fibers 1 are arranged with their bare parts in the capillary tube 21, the coating 7 terminating at the funnel 25.

Figure 3E:
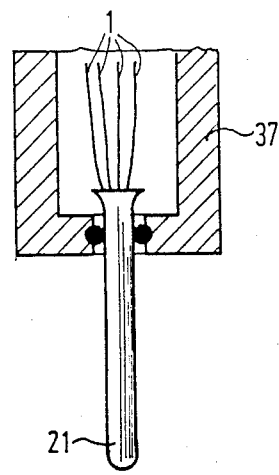
Figure 3F:
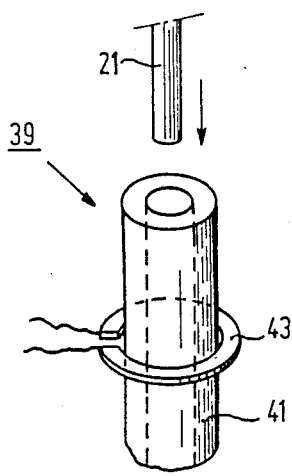

Subsequently, the capillary tube 21 is connected to a vacuum chamber 37 and is evacuated to a pressure lower than $10^{-1}$ mbar, which stage is shown in FIG. 3e. The capillary tube 21 is then degassed by arranging it above the furnace 39 shown in FIG. 3f. Furnace 39 consists of a graphite sleeve 41 which is flushed with $N_2$ and is heated by a high-frequency coil 43.

Figure 3G:
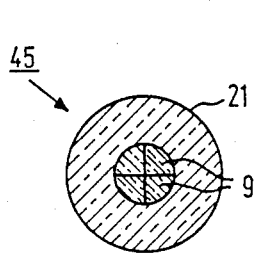

Subsequently, the capillary tube 21 is introduced into the furnace 39, which is already at the fusion temperature of 1600° to 1800° C. Depending upon the temperature in the furnace, the time required for fusion is 1 to 10 minutes. At the correct temperature and heating time, the capillary tube 21 shrinks under the influence of the vacuum and the atmospheric pressure, while maintaining the circular cross-section due to surface tension. The end portions 9 of the fibers are deformed into a symmetrical cross-sectional pattern of the kind shown in FIGS. 3g and 3h. The capillary tube 21 is fused with the end portions 9 of the fibers to form therewith a solid rod 45.

Figure 3H:
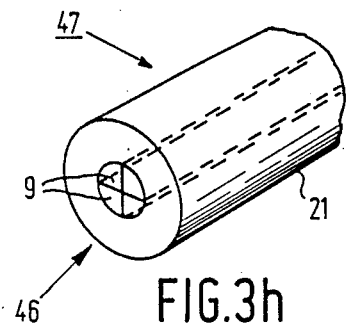
Figure 3I:
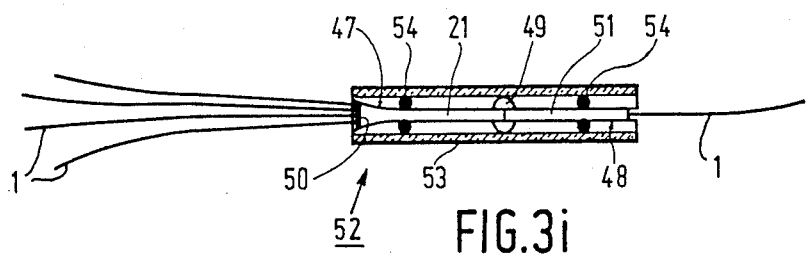

The tube 21 is removed from the furnace and the outer coatings of the fibers are glued to the funnel 25. Subsequently, the sealed end of the rod 45 is removed, preferably by scribing and cleaving. The ruptured end surface of the resulting fiber head 47 is finished by grinding and polishing to form the end face 46. FIG. 3h shows the finished fiber head 47 with the end face 46.

As already described above, the fused end portions 9 of the fibers have a diameter and a cross-section substantially identical in shape and size to the diameter and the cross-section of a single fiber core. Consequently, as shown in FIG. 3i, for assembling a splitter 52, the fiber head 47 can be directly coupled and fixed to a fiber head 48 comprising a single fiber 1 by a glue connection 49 in the manner already described. The free end of the single fiber is inserted and fixed in a capillary tube 51 having the same external diameter as the fiber head 47. Subsequently the fiber heads 47 and 48 are inserted into a quartz envelope 53 and are fixed therein by glue beads 54.

Figure 4A:
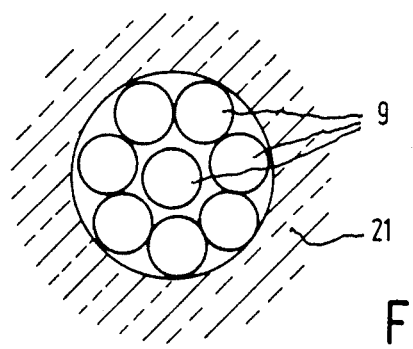
FIGS. 4a, 4b and 4c show successive steps of another embodiment according to the invention.
Figure 4B:
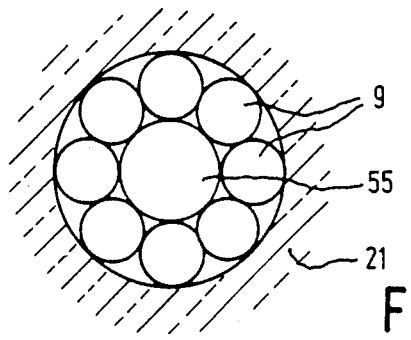
Figure 4C:
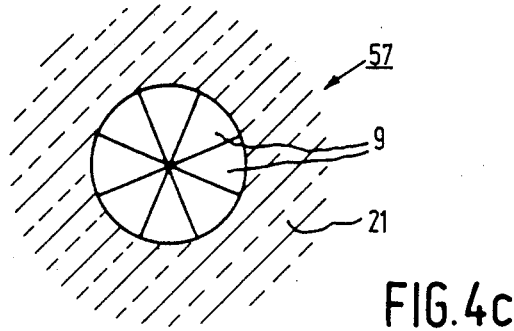

FIGS. 4a, 4b and 4c show the fusion of six or more fibers. It is not possible to arrange six or more fibers in a dense packing without interstices in the capillary tube 21. FIG. 4a shows that with, for example, eight fibers, the packing is loose resulting in such interstices that fusion with a symmetrical cross-section pattern is not obtained.

As shown in FIG. 4b, this problem is obviated by arranging a temporary supporting member 55, for example a tungsten wire, at the center of the capillary tube 21, and by distributing the fibers in contact with one another around the inner circumference of the tube. By a thermal pretreatment, the fibers are adhered to the inner surface of the tube 21. The supporting member 55 is then removed after which the fibers 9 and tube 21 are fused. A fiber head 57 is produced in which the fused end portions 9 of the fibers each have a sectorial cross-section. (FIG. 4c.)

For manufacturing fiber heads having a reduced minimum length, the capillary tube preferably is heated by means of a $CO_2$ laser. To this end the sealed capillary tube is rotated, and a focused laser beam is directed radially onto the capillary tube and is displaced along the tube in the axial direction thereof. Due to the concentrated local heating of the tube, the distance between the fused fiber ends and the outer coatings of the fibers (i.e. the length of the bare fiber portions) can be reduced considerably. A similar improvement can be obtained by using a small burner or torch, the small spot-like flame of which also enables a concentrated local heating of the capillary tube.

In the embodiment described above, the sealed end rod 45 is removed by scribing and cleaving. The ruptured end surface of the resulting fiber head 47 is finished by grinding and polishing. When after cleaving and after grinding of the ruptured surface the fused fiber ends are firepolished with a small $H_2O$ burner, an end face is obtained with on the one hand a very smooth polished surface at the light transmitting area, and on the other hand a relatively rough surface with good bonding properties at the bonding area.

As already set out above the present method is suited for processing graded-index fibers and step-index fibers as well. The embodiment described deals with the processing of multimode fibers. However, the present method is not limited to the processing of multimode fibers. Experience has shown that due to the high degree of reproducibility and precision obtained, the method is also suited for processing single mode fibers.

What is claimed is:
1. A passive fiber optic component comprising:
a glass core having a refractive index and having a substantially circular cross-section;
a glass cladding surrounding the core, said cladding having a refractive index less than the refractive index of the core and having a substantially circular cross-section; and
at least two optical fibers optically coupled to the core, each of said fibers having end portions with reduced cross-sections;
wherein the glass core comprises end portions of the optical fibers fused together to form a solid glass core with no spaces between the fiber end portions, the fused end portions collectively having circular cross-section the diameter of which is substantially equal to the diameter of the core of one of said at least two optical fibers.
2. A passive fiber optic component comprising:
a glass core having a refractive index and having a substantially circular cross-section;
a glass cladding surrounding the core, said cladding having a refractive index less than the refractive index of the core and having a substantially circular cross-section; and
at least two optical fibers optically coupled to the core, each of said fibers having end portions with reduced cross-sections;
wherein:
the glass cladding has a substantially cylindrical end portion with a substantially constant diameter; and
the end portion of the optical fibers are fused together to form a solid glass core with no spaces between the fiber end portions, and the glass core has a substantially cylindrical end portion with a substantially constant diameter.
3. A passive fiber optic component as claimed in claim 2, wherein the optical fibers are multimode fibers.
4. A passive fiber optic component in claimed in claim 2, wherein the optical fibers are single mode fibers.
5. A passive fiber optic component comprising:
a glass core having a refractive index and having a substantially circular cross-section;
a glass cladding surrounding the core, said cladding having a refractive index less than the refractive index of the core and having a substantially circular cross-section; and at least two optical fibers optically coupled to the core, said fibers having end portions with reduced cross-sections;

wherein:

the glass core comprises the end portions of the optical fibers, said end portions being fused together to form a solid glass core with no spaces between the fiber end portions, the diameter of the circular cross-section of the fused end portions being substantially equal to the diameter of the core of one of said at least two optical fibers, said glass core having a substantially cylindrical end portion with a substantially constant diameter; and the glass cladding has a substantially cylindrical end portion with a substantially constant diameter.

6. An optical splitter comprising:

a fiber head having a glass core and a glass cladding surrounding the core, said core and cladding having an end face, said core having a diameter at the end face; and an optical fiber having a core and a cladding surrounding the core, said core and cladding having an end face, said core having a diameter at the end face substantially equal to the diameter of the core of the fiber head, said end faces adjoining each other;

wherein:

the glass core of the fiber head has a refractive index, has a substantially circular cross-section, and has a substantially cylindrical end portion with a substantially constant diameter;

the glass cladding of the fiber head has a refractive index less than the refractive index of the core, has a substantially circular cross-section, and has a substantially cylindrical end portion with a substantially constant diameter;

the fiber head further comprises at least two optical fibers optically coupled to the core of the fiber head, said fibers having end portions with reduced cross-sections; and the glass core of the fiber head comprises the end portions of the optical fibers, said end portions being fused together to form a solid glass core with no spaces between the fiber end portions.

7. An optical coupler comprising:

a first fiber head having a glass core and a glass cladding surrounding the core, said core and cladding having an end face, said core having a diameter at the end face; and a second fiber head having a core and a cladding surrounding the core, said core and cladding having an end face, said core having a diameter at the end face equal to the diameter of the core of the first fiber head, said end faces adjoining each other;

wherein:

the glass core of each fiber head has a refractive index, has a substantially circular cross-section, and has a substantially cylindrical end portion with a substantially constant diameter;

the glass cladding of each fiber head has a refractive index less than the refractive index of the core, has a substantially circular cross-section, and has a substantially cylindrical end portion with a substantially constant diameter;

each fiber head further comprises at least two optical fibers optically coupled to the core, said fibers having end portions with reduced cross-sections; and the glass core of each fiber head comprises the end portions of the optical fibers, said end portions being fused together to form a solid glass core having spaces neither between the fiber end portions.

8. A passive fiber optic component comprising:

a glass core having a refractive index and having a substantially circular cross-section;

a glass cladding surrounding the core, said cladding having a refractive index less than the refractive index of the core and having a substantially circular cross-section; and at least two optical fibers optically coupled to the core, said fibers having end portions with reduced cross-sections, each end portion having a cross-section shaped substantially as a sector of a circle;

wherein:

the glass core is derived by a method wherein the outer coating of at least two fibers each comprising a glass core having a refractive index, a glass cladding surrounding the core having a refractive index less than the refractive index of the core, and an outer coating surrounding the cladding is removed over a selected length from the end of the fiber to produce a bare fiber end portion;

the bare end portion of each fiber is etched to produce a conical etched portion and an adjoining cylindrical etched portion, the cylindrical etched portion having a substantially constant diameter and adjoining the end of the fiber;

the etched fiber end portions are arranged in the bore of a glass tube having a bore with a substantially circular cross-section, which is closed at one end and which has a refractive index less than the refractive index of the cores of the fibers and the tube is evacuated;

the evacuated tube and the etched fiber end portions therein are heated to collapse the tube around the etched end portions without drawing the tube and to fuse the etched fiber end portions to each other and to the tube whereby the heated etched fiber end portions are deformed to eliminate spaces between the etched fiber end portions to produce a solid rod with a substantially circular cross-section and with a core of substantially circular cross-section;

the closed end of the collapsed tube is removed to expose the ends of the deformed fiber end portions; and the exposed ends are polished to produce a fused fiber head.

9. A passive fiber optic component as claimed in claim 8, wherein:

the glass cladding has a substantially cylindrical end portion with a substantially constant diameter;

the end portions of the optical fibers are fused together to form a solid glass core with no spaces between the fiber end portions, and the glass core has a substantially cylindrical end portion with a substantially constant diameter.

10. A passive fiber optic component as claimed in claim 9, wherein the optical fibers are multimode fibers.

11. A passive fiber optic component as claimed in claim 9, wherein the optical fibers are single mode fibers.

12. A passive fiber optical component as claimed in claim 8, wherein the etched fiber end portions are regularly distributed around the circumference of the bore by a method wherein:

a cylindrical supporting member is provided in the bore, said etched fiber end portions being arranged around the cylindrical supporting member;

the tube and the etched fiber end portions are heated to adhere the etched fiber end portions to the tube;

and the cylindrical supporting member is then removed.